(12) United States Patent
Pecharsky et al.

(10) Patent No.: US 9,663,364 B2
(45) Date of Patent: May 30, 2017

(54) METHOD OF MAKING ALKALI METAL HYDRIDES

(71) Applicant: Iowa State University Research Foundation, Inc., Ames, IA (US)

(72) Inventors: Vitalij K. Pecharsky, Ames, IA (US); Shalabh Gupta, Ames, IA (US); Marek Pruski, Ames, IA (US); Ihor Hlova, Ames, IA (US); Andra Castle, Ames, IA (US)

(73) Assignee: Iowa State University Research Foundation, Inc., Ames, IA (US)

( * ) Notice: Subject to any disclaimer, the term of this patent is extended or adjusted under 35 U.S.C. 154(b) by 0 days.

(21) Appl. No.: 14/757,132

(22) Filed: Nov. 23, 2015

(65) Prior Publication Data

US 2017/0022060 A1   Jan. 26, 2017

Related U.S. Application Data

(60) Provisional application No. 62/231,964, filed on Jul. 21, 2015.

(51) Int. Cl.
*C01B 6/04*   (2006.01)
*C01B 6/24*   (2006.01)

(52) U.S. Cl.
CPC . *C01B 6/04* (2013.01); *C01B 6/24* (2013.01)

(58) Field of Classification Search
CPC .................................. C01B 6/04; C01B 6/24
USPC ...................................................... 423/646
See application file for complete search history.

(56) References Cited

U.S. PATENT DOCUMENTS

| 1,796,265 | A | 3/1931 | Freudenberg | |
|---|---|---|---|---|
| 2,372,670 | A | 4/1945 | Hansley | 23/204 |
| 2,372,671 | A | 4/1945 | Hansley | 23/204 |
| 3,222,288 | A | 12/1965 | Hansley | 252/182 |
| 3,387,948 | A | 6/1968 | Synder | 23/365 |
| 3,387,949 | A | 6/1968 | Synder | 23/365 |
| 3,485,585 | A | 12/1969 | Synder | 23/204 |

FOREIGN PATENT DOCUMENTS

| DE | 35 06 071 A1 | 2/1985 |
|---|---|---|
| EP | 0 063 987 A1 | 6/2005 |

OTHER PUBLICATIONS

Hout et al. "Preparation of the hydrides Mg,FeH, and Mg,CoH, by mechanical alloying followed by sintering" Journal of Alloys and compounds 1997, 248, p. 164-167.*
Elansari et al. "Preparation of alkali metal hydrides by mechanical alloying" Journal of ALloys and Compounds, 2001, 329, p. L5-L8.*
L. Zaluski et al., "Hydrogenation properties of complex alkali metal hydrides fabricated by mechano-chemical s:synthesis", Journal of Alloys and Compounds, 290, 71-78, 1999.

(Continued)

*Primary Examiner* — Stanley Silverman
*Assistant Examiner* — Syed Iqbal

(57) ABSTRACT

A method is provided for making alkali metal hydrides by mechanochemically reacting alkali metal and hydrogen gas under mild temperature (e.g room temperature) and hydrogen pressure conditions without the need for catalyst, solvent, and intentional heating or cooling.

20 Claims, 11 Drawing Sheets

(56) References Cited

OTHER PUBLICATIONS

L. Elansari et al., "Preparation of alkali metal hydrides by mechanical alloying", Journal of Alloys and Compounds, 329, L-5-L8, 2001.
A. E. Finholt et al., "Lithium Aluminum Hydride, Aluminum H Hydride and Lithium Gallium Hydride, and Some of their Applications in Organic and Inorganic Chemistry", J. Am. Chem. Soc., 69 1199-1203, 1947.
S. Krishnamurthy, "Trialkylborohydrides as New Versatile Reducing Agents in Organic Synthesis", Aldrichimica Acta, vol. 7, No. 3, 1974.
Peter Rittmeyer et al., "Hydrides', Ullman's Encylopeida of Industrial Chemistry", vol. 18, pp. 103-132, 2012.
J. Plesek et al., "Sodium Hydride", Iliffe Books Ltd., London, 1968.

\* cited by examiner

METHOD OF MAKING ALKALI METAL HYDRIDES

RELATED APPLICATION

This application claims benefit and priority of U.S. provisional application Ser. No. 62/231,964 filed Jul. 21, 2015, the entire disclosure of which is incorporated herein by reference.

CONTRACTUAL ORIGIN OF THE INVENTION

This invention was made with government support under Grant No. DE-AC02-07CH11358 awarded by the U.S. Department of Energy. The government has certain rights in the invention.

FIELD OF THE INVENTION

The present invention relates to a method of making alkali metal hydrides by mechanochemically reacting the alkali metal and hydrogen under mild temperature (e.g. ambient temperature) and hydrogen pressure conditions.

BACKGROUND OF THE INVENTION

Alkali metal hydrides find wide application in chemical industry and laboratory practice. LiH, for example, is broadly used as a strong reducing agent in chemical syntheses to prepare other hydrides, amides, isotopic compounds, and a variety of reagents for organic synthesis. LiH is also a highly desirable material for neutron shielding or moderating for mobile nuclear reactors. NaH is primarily used as a strong base in organic synthesis capable of deprotonating a range of weaker Bronsted acids to yield the corresponding sodium derivatives. It is used in the production of ethers via Williamson synthesis, alkylation of a-carbon atoms of ketones, and alkylation of amines, carboxylic acids, esters and nitriles. The carbanions produced with NaH are used in many condensation reactions which are important in the production of pharmaceutical intermediates.

Preparation of alkali-metal hydrides has been achieved and described in several earlier inventions. In one such process, hydrogen is passed over fused sodium metal at 350° C. to form NaH on the surface followed by its separation from metal with liquid ammonia. To achieve large scale synthesis of alkali metal hydrides, Freudenberg and Kloepfer invented a method in 1931 in which alkali metal is rendered into a finely divided state by several means such as by spraying fused metal through a nozzle, or by mixing the metal with a pulverulent solid diluting agents. In the procedure described in this early patent, alkali-metal is ground, for example in a ball-mill, with a selected diluent, which may consist of unreactive material such as iron powder, soda or common salts. Salts may include alkali-metal hydrides themselves to prevent cold welding and clamping, and achieve a finely divided state of the alkali metal. This process is carried out under inert conditions to prevent oxidation of active metals. This finely divided metal along with the diluent is then exposed to flowing hydrogen at elevated temperatures between 200-300° C. to form corresponding alkali metal hydrides. Some aspects of this procedure, however, may not be conducive to a large scale operation. For instance, transfer of highly active milled metal from one reactor to another, or heating the powders under hydrogen at elevated temperatures may constitute significant safety hazards.

Subsequent work by V. L. Hansley (U.S. Pat. Nos. 2,372,670; 2,372,671; 3,222,288) to produce alkali metal hydrides was aimed mainly at improving the rate of reactions between the metals and hydrogen by introducing small quantities (not exceeding 10 wt %) of so called "activators" such as aromatic hydrocarbons, other petroleum based hydrocarbons or fatty acids having more than 8 carbon atoms. Addition of such organic activators/diluents would however require further processing and may compromise the purity of the product. In a similar process, alkali-metal hydrides are also prepared as their dispersions in a variety of inert liquids such as hydrocarbons, ethers and tertiary amines used as a reaction medium. In this process, organic compounds of elements of groups 4 and 14 such as butyl titanate or triethyl silicol are used as dispersants. Once again, such processes result in products that require further processing to obtain pure hydride products. Currently, alkali metal hydrides are industrially produced by heating pure metal above their respective melting temperatures under hydrogen atmosphere. For example, LiH is produced from the reaction of lithium metal and hydrogen gas at more than 500° C.

More recent work by J. C. Snyder (U.S. Pat. Nos. 3,387,948; 3,387,949; 3,485,585), describes a process of preparation of alkali-metal hydrides that involves reaction of alkali-metal with hydrogen in the presence of a transition-metal catalyst in the form of free-metal or its hydride or halide salts. These reaction components are introduced into a mill-like reactor and suspended in an inert organic liquid that may or may not act as a solvent for the product. The reaction mixture is then heated at temperatures between 80-200° C. under hydrogen pressure of 70-350 bar with constant comminution of the reaction mixture. It is understood that comminution via milling is employed in this method mainly to assist in mass transfer, and the reaction is mostly thermal in nature and not promoted by the mechanical energy as generated in the high-energy ball-milling (HEBM) process.

A mechanochemical synthesis of alkali-metal hydrides (AH where A=Na, K, Cs and Rb) by HEBM under hydrogen pressure carried out without addition of a catalyst or a dispersing agent is described in the work by Elansari et al [JALCOM 2001, 329, L5]. Although the authors report the initiation and significant progress of reaction in their case, after 12 hours of milling, it was necessary to place the reactors under elevated temperatures (about 120° C.) for the reaction to complete.

U.S. Pat. Nos. 2,372,670; 2,372,671; 3,222,288; 3,387,948; 3,387,949; and 3,485,585 describe two-step synthesis of simple alkali metal hydrides using ball milling to provide metal (e.g. Na pieces) pieces of suitable size followed by reduction of the metal pieces at elevated temperatures. U.S. Pat. No. 1,796,265 describes a one-step and two-step process to make simple alkali metal hydrides using ball milling in flowing hydrogen at 180 to 300 degrees C. for making NaH.

SUMMARY OF THE INVENTION

The present invention provides a solvent-free, catalyst-free mechanochemical method of making alkali metal hydrides such as AH in which A is a metal comprising at least one of Li, Na, K, Rb, and Cs by direct reaction of alkali metal(s) and hydrogen gas at ambient temperature or other mild temperatures in a mechanochemical reactor. The reactants are subjected in a reactor to simultaneous mechanical milling action and chemical reaction (reactive milling) under mild temperature and hydrogen over-pressure conditions to form alkali metal hydride. The method is dry (solvent-free)

and catalyst-free, and hence no further processing, i.e. solvent removal or purification is required.

In an illustrative embodiment of the present invention, the mechanochemical reaction can be effected in the reactor in a relatively short time using a mild temperature such as about 0 to about 100 degrees C., preferably from 10 to 40 degrees C., even more preferably ambient (room) temperature of about 20 to 26 degrees C. The hydrogen pressure in the reactor can be from about 1 to about 350 bars, preferably from 25 to 350 bars. Reaction times can be 20 hours or less for purposes of illustration and not limitation, depending upon the applied hydrogen over-pressure and milling intensity, making practice of the method process less energy intensive.

In practice of the present invention, fine hydride powder, either added from external to the reactor or formed in-situ in the reactor, of the same alkali metal of the hydride is used to overcome the drawbacks of milling of ductile alkali metal material. Use of such added or in-situ-formed fine hydride powder is beneficial to avoid the milling balls from quickly welding to the walls of the reactor via the ductile alkali metal reactant, whereby the balls are no longer capable of producing the milling action.

An advantage offered by this method is that, a semi-continuous mode of operation, in which the ball mill (reactor) is stopped only occasionally to recover a portion of the alkali metal hydride product and to add fresh metal and hydrogen, is an alternative embodiment of the invention. Also, preferably, since no heating and cooling are involved during the chemical milling process, both time and energy are saved.

Although the method of the present invention is described below using alkali metal hydrides as examples, it is understood that the process is suitable for production of alkali metal deuterides (AD) and alkali metal tritides (AT). Also, if intended, mixed hydrides such as, for example, AH-A'H or $A_{1-x}A'_xH$, where A and A' are different alkali metals listed above, may also be prepared according to the invention described here.

The present invention will become more readily understood from the following detailed description taken with the drawings.

BRIEF DESCRIPTION OF THE DRAWINGS

FIGS. 2a, 2b, 2c, and 2d are scanning electron micrographs in which FIG. 2a shows commercial LiH; FIG. 2b shows a sample obtained after 20 hours of milling; and FIGS. 2c and 2d show samples after 3 hours of milling.

DESCRIPTION OF THE INVENTION

Figure 1A:
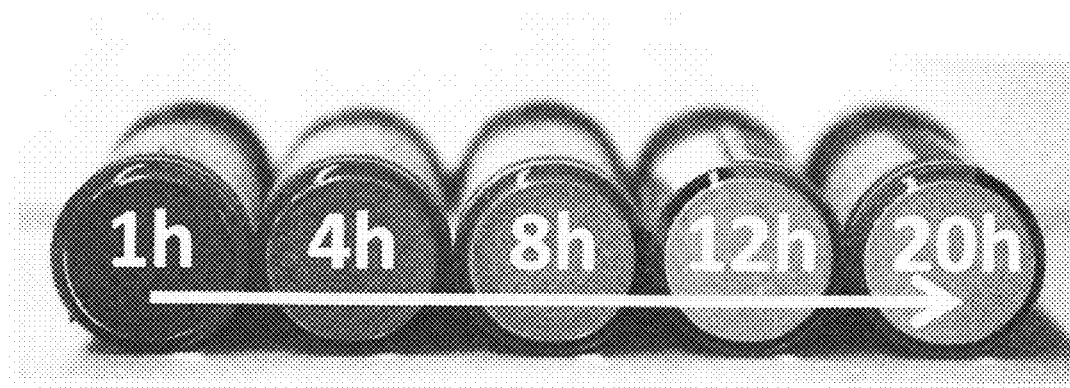
FIG. 1a illustrates observed change in the sample color (colors indicated by dark gray, lighter gray, and white) of Li—LiH mixture as a function of milling time.

The present invention provides a solvent-free, catalyst-free mechanochemical method of making alkali metal hydrides, that include AH in which A can be at least one of Li, Na, K, Rb, and Cs, by direct reaction of the alkali metal and hydrogen gas using a mild temperature and hydrogen gas over-pressure wherein the reactants are subjected in a reactor to simultaneous mechanical milling action to produce finely divided alkali metal particulates and chemical reaction (reactive milling) to form the desired alkali metal hydride. For example, an embodiment of the method involves mechanochemically reacting an alkali metal and hydrogen gas at a temperature of 0 to 100 degrees C. and hydrogen gas present initially or over time in at least a stoichiometric amount to convert substantially all of the alkali metal to hydride (i.e. in a single reaction or in repeated reactions in the reactor where fresh alkali metal and/or fresh hydrogen gas is/are added in increments together or separately as need to convert substantially all of the alkali metal to hydride). Practice of the method of the present invention can be conducted without the need for solvent, catalyst, and a liquid dispersing agent so that no further processing, such as solvent removal or purification, is required.

In an illustrative embodiment of the present invention, the mechanochemical reaction can be effected in the reactor in a relatively short time using a mild temperature such as about 0 to about 100 degrees C., preferably from 10 to 40 degrees C., and even more preferably ambient (room) temperature of about 20 to 26 degrees C. A hydrogen gas pressure of about 1 to about 350 bars, preferably about 25 to about 350 bars is used. Reaction times can be 20 hours or less for purposes of illustration and not limitation, depending upon the applied hydrogen over-pressure and milling intensity, making practice of the method process less energy intensive.

For purposes of illustration and not limitation, the hydrogen gas can comprise essentially pure lightest isotope protium—$^1$H, which was used in the Examples set forth below. The hydrogen gas also can comprise essentially pure heavy isotope deuterium—$^2$H. The hydrogen gas further can comprise essentially pure heaviest isotope tritium—$^3$H. Moreover, the hydrogen gas can comprise a mixture of $^1$H, $^2$H and $^3$H, in which any of the isotopes is present in concentrations ranging between 1 and 99 vol. %. Thus, metal hydrides made by practicing embodiments of the invention can include different concentrations of hydrogen isotopes in their makeup An illustrative preferred embodiment of the present invention relates to a method of production of alkali-metal monohydrides of the type AH by a solvent-free mechano-chemical process carried out in a milling container (reactor) in a ball mill maintained at ambient (room) temperature without the need to either heat or cool the ball mill or milling container. The method utilizes the solid-gas reaction between an alkali metal (A metal) such as at least one of Li, Na, K, Rb, and Cs, with gaseous hydrogen as described in the general preferred reaction scheme below:

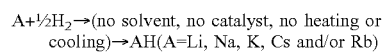

The following Examples provide experimental method parameters and results that are offered to further illustrate, but not limit, the method of the present invention. The Examples employ a mechanochemical method that is demonstrated utilizing two different types of laboratory scale/bench top ball-mills: (1) a vertically mounted Magnetic Ball-mill (Universal-Ball-Mill 5, A.O.C. Scientific Engineering Pty Ltd, Australia), and (2) a horizontal Planetary style Micro Mill (PULVERISETTE 7, Fritsch GmbH, Germany). In a typical reaction in the magnetic mill, a total of 1 gram of reaction mixture [e.g. alkali metal(s) and preformed hydride] was mixed with about 128 grams of stainless steel balls (8 balls, about 16 grams each) in a respective milling container, which is sealed under argon atmosphere in the glove box. The sealed milling container is then removed from the glove box and purged twice with pure hydrogen before pressurizing the milling container with hydrogen to the desired pressure.

For the demonstration purposes, the hydrogen pressure used for hydrogenation reactions in the reactor was varied between 25-350 bars in order to achieve appreciable reaction rates. As will be described later, the over-pressure required for successful transformation may be contingent upon the milling intensity and the configuration of the mill (reactor), and in some cases it may be possible to carry out the reactions with only a stoichiometric amounts of hydrogen, in which case the required pressure will depend on the volume of the milling container and the charge mass. It was also observed in some examples, that under higher hydrogen over-pressure, faster reaction kinetics were achieved without altering the nature of the hydride products.

For reactions carried out in a planetary mill, high-pressure milling containers were utilized in which a 1-2 gram of total charge was milled, along with twenty-five (25) stainless-steel balls each weighing about 7 gram (11 mm in dia.). Products were analyzed after 60 min of milling under hydrogen pressure varying between 25-350 bars, at the rotation speed of about 300 rpm. The high-pressure milling containers were designed to perform milling under hydrogen pressure of up to 350 bar. The containers are made out of Type 316L stainless steel with hardened steel liners, and comprised of a cylindrical base with rounded bottom about 2.75 in. diameter. The lid, fitted with high-pressure Swagelok ball-valve, is fastened with screws to a clamping ring holding the base. The total milling volume of each container is about 95 ml.

Extremely high air and moisture sensitivity of alkali-metals and their hydrides required all manipulations to be carried in an argon filled glove-box that was maintained at oxygen and moisture levels at less than 1 ppm v/v. The products obtained by mechanochemical processing were characterized by X-ray powder diffraction (PXRD), $^{6,7}Li$ Magic Angle Spinning (MAS)—Solid State Nuclear Magnetic Resonance (SSNMR), and gas-volumetric techniques. Hydrogen desorbed during gas-volumetric measurements, was analyzed by a residual gas analyzer system (RGA100). The lithium metal used in the Examples was purchased from Alfa Aesar (99.9% metals basis) in the form of rods (0.5 inch×6.5 inch) coated in mineral oil. Prior to their use, these rods were cleaned by wiping off the mineral oil with Kimwipe cleaning wipes followed by dipping them in methanol bath for 20 seconds to degrease them. The black oxide layer was then scrapped off using a metal brush and the rods were dipped in chilled methanol bath until the lithium surface appeared to be shiny. Rods were then dried using Kimwipes cleaning wipes and transferred to an argon filled Ball jar that was immediately evacuated in the ante-chamber of glove box, in which it was stored under argon. Prior to its use, the thin oxide coating was removed using a wire brush. Small irregular pieces of lithium metal were cut from the rods using surgical blade and used for the mechanochemical hydrogenation. Sodium metal (pieces, 3-12 mm, 99.95% metals basis) and cesium (ingot, 99.8%, metals basis) were obtained from Alfa Aesar, and potassium (ingot, 99.95%, metals basis) and rubidium (ingot, 99.6%, metals basis) were obtained from Sigma Aldrich and were used without further purification.

EXAMPLE 1

Mechanochemical Synthesis of Lithium Hydride (LiH) in Magnetic Ball-Mill

In a mechanochemical method embodiment, irregularly shaped lithium metal pieces (all dimensions less than 1 mm) were mixed with commercial LiH powder (Sigma Aldrich, 95% purity), and transferred to milling containers for processing in a magnetic ball mill. The magnetic ball mill was used since the milling configuration and intensity regime in a magnetic ball-mill is likely to be closer to the industrial mill design than the high-energy planetary or vibrator type mill. To this end, this Example was tested in the lower-energy magnetic mill (i.e. the vertically mounted Universal-Ball-Mill 5, A.O.C. Scientific Engineering Pty Ltd, Australia). Besides the conventional gravitational and the centrifugal forces that operates in a ball-mill, this mill also utilizes magnetic forces acting on the magnetic milling media from the two variably positioned Nd—Fe—B permanent magnets. Together with milling speed, the relative position of the magnets can be used to select between predominantly impact and predominantly shear forces or components of both. In the example presented here, one-magnet strong-impact mode was used for milling. More design and operational details of the magnetic mill are given in the following reference [Varin, R. A., Czujko, T., & Wronski, Z. S. (2009). in *Nanomaterials for solid state hydrogen storage*. Springer Science & Business Media. p 34-36], which is incorporated herein by reference. The milling containers for a magnetic ball mill were designed in similar manner as described earlier for vials for the planetary ball mill, with minor design exception; i.e., the lid was fastened directly to the base and no clamping ring was used. The base diameter for the magnetic mill container is 5.25 inch with total volume of 110 ml.

In a typical experimental procedure, a total of 1 gram mixture of Li and LiH in 1:1 ratio by weight (about 1:1 by stoichiometry) was milled. The mill was operated at 150 rpm for the first 15-20 minutes in order to allow mixing and coating the surface of Li-metal with LiH powder. The final speed was then set to 200 rpm, and milling was allowed to proceed for the desired duration. It is noted that initial milling at lower energy may be critical in order to prepare the metal surface for reaction to progress, and to avoid the welding of the balls to the container by means of ductile Li metal. This incubation period is most likely dependent upon the applied hydrogen pressure, but this parameter was not systematically studied in this Example. Also, empirical evidence suggests that this incubation time is less beneficial when LiH used for seeding is freshly prepared; for example, in the second or subsequent batch of production, in which metal is added to the freshly formed LiH.

Figure 1B:
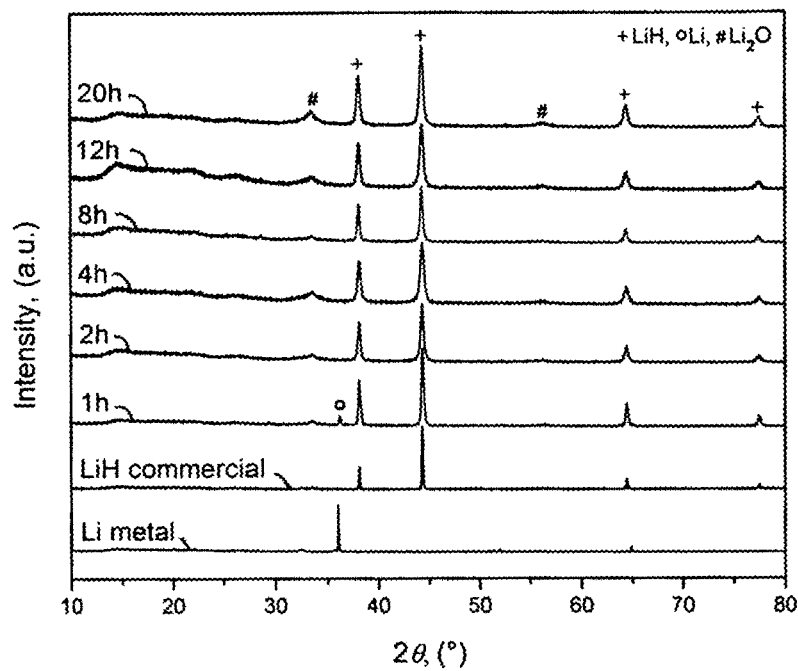
FIG. 1b shows X-ray diffraction patterns and FIG. 1c shows $^7$Li NMR for LiH samples prepared at different milling times in a magnetic ball mill. The two low intensity broad peaks at about 33.5° and 56.3° are ascribed to $Li_2O$, which is formed during acquisition of C-ray diffraction data.
Figure 1C:
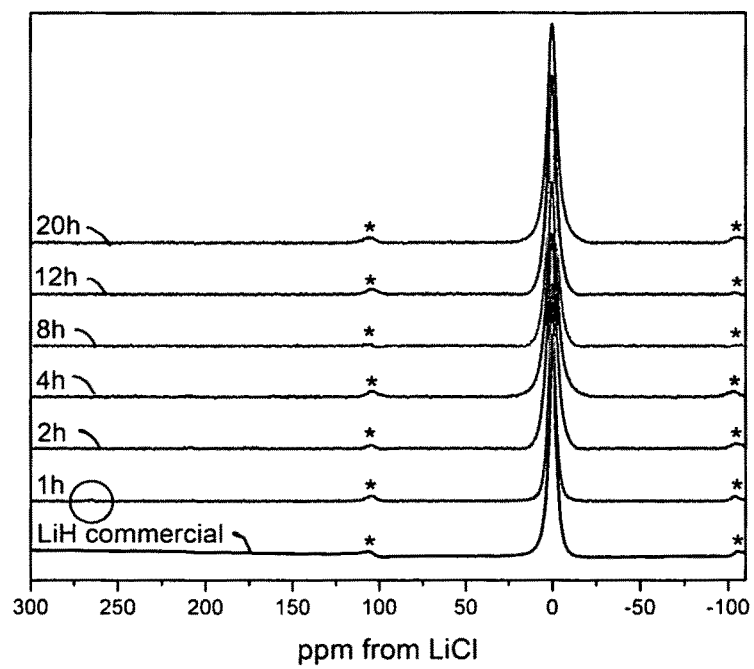

FIGS. 1*a*, 1*b*, 1*c* show the progress of transformation over a period of 20 hours of milling. A sample withdrawn after 1 hour of milling appeared as a fine dark gray powder with no obvious sign of metallic lithium being present. However, both X-ray diffraction and $^7$Li SSNMR studies indicate the presence of metallic lithium, which suggests that the metal is present in the sample in a highly divided state, and also explains the dark gray appearance of the powder.

Thereafter, samples were analyzed at 2, 4, 8, 12, 16 and 20 hour time points, during which the sample changed color from dark gray to light gray and eventually turned white after 12 hours of milling, which indicated completion of the reaction to form hydride. Although the sample color indicates the presence of fine metallic particles, the X-ray diffraction of samples milled beyond 1 hour did not show Bragg-peaks corresponding to metallic lithium, which may result from the amorphization of metallic lithium prior to its reaction with hydrogen or simply due to the concentration of lithium being below the detection limit of laboratory X-ray.

FIG. 1a illustrates the observed change in the sample color (darker gray to lighter gray to white) of the Li—LiH mixture as a function of milling time. FIG. 1b shows an X-ray diffraction patterns and FIG. 1c shows a $^7$NMR image for LiH samples prepared at different milling times in a magnetic ball mill. The two low intensity broad peaks at about 33.5 and 56.3° are ascribed to $Li_2O$, which is formed during acquisition of X-ray diffraction data.

Figure 2A:
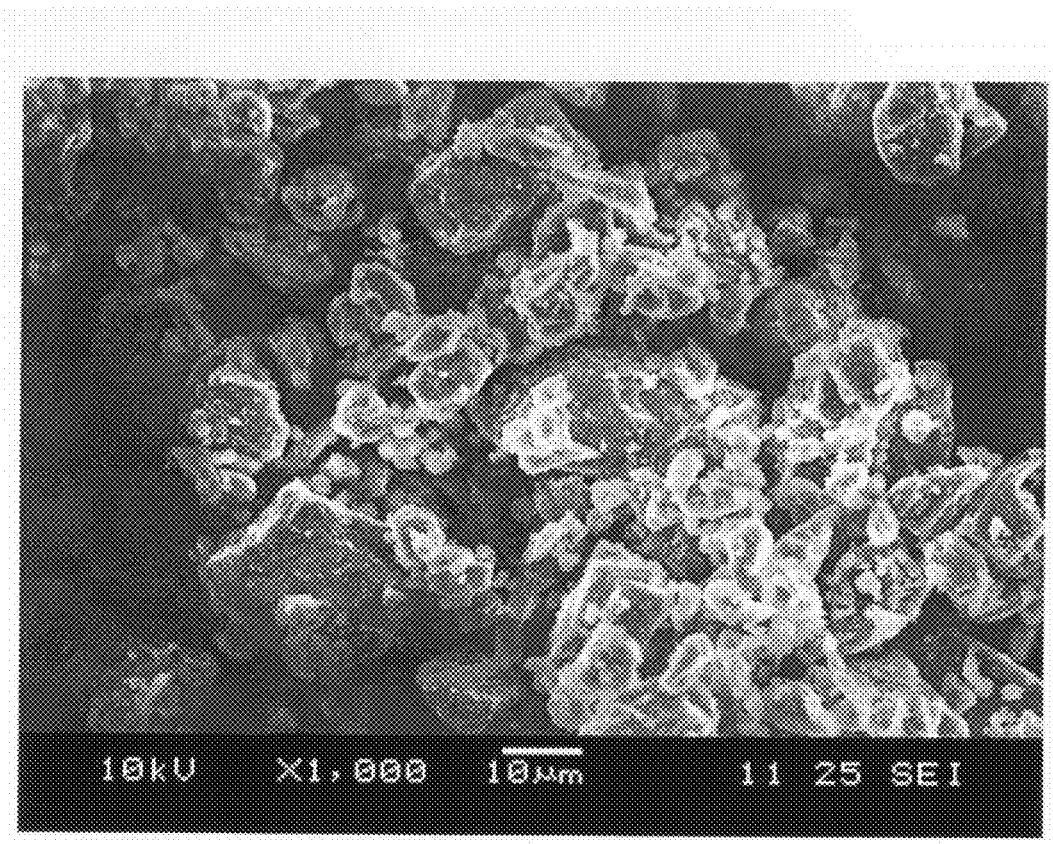
Figure 2B:
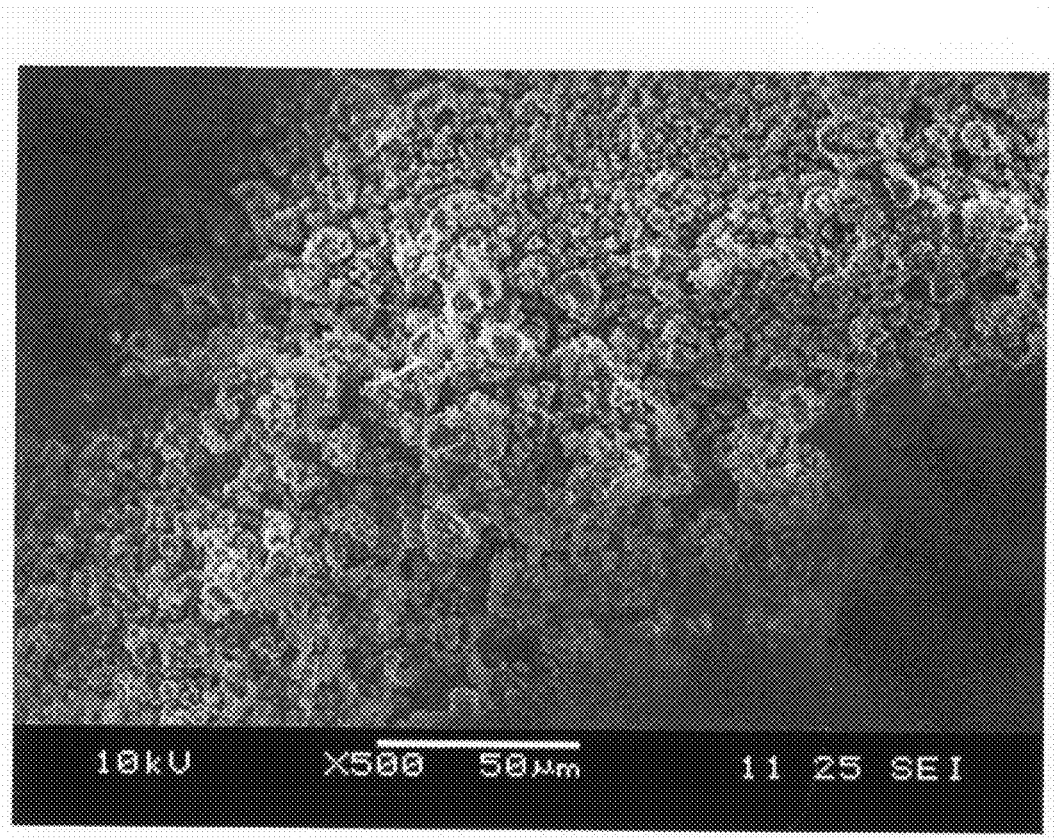
Figure 2C:
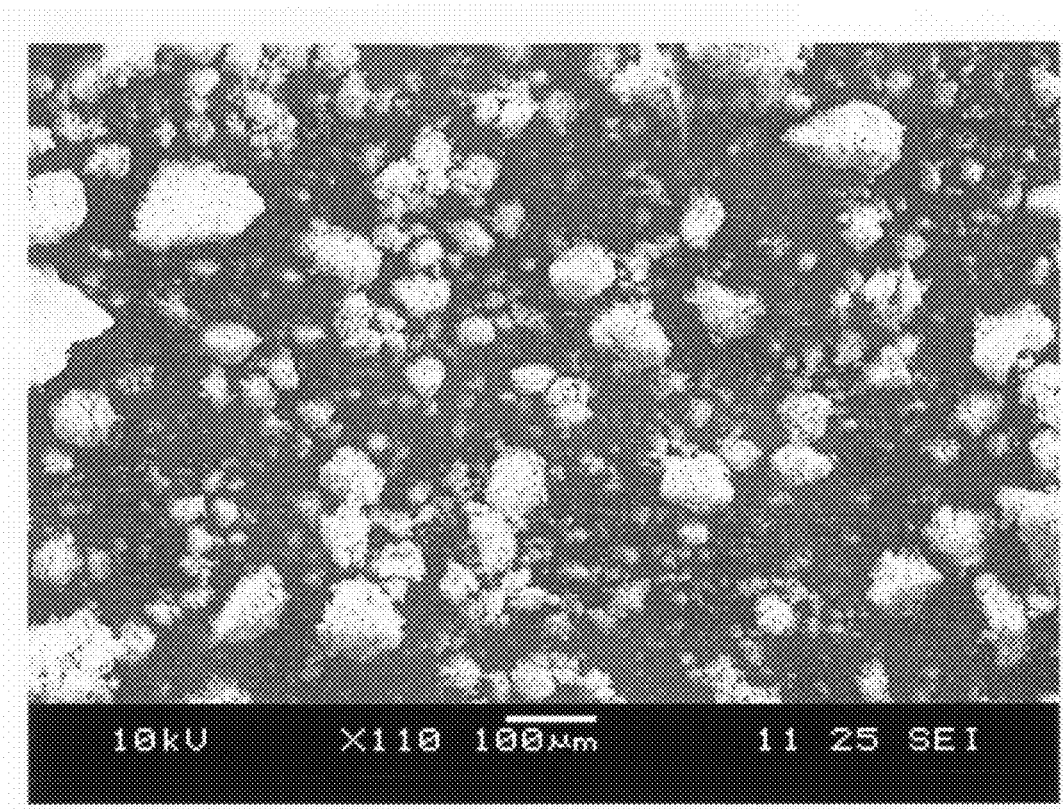
Figure 2D:
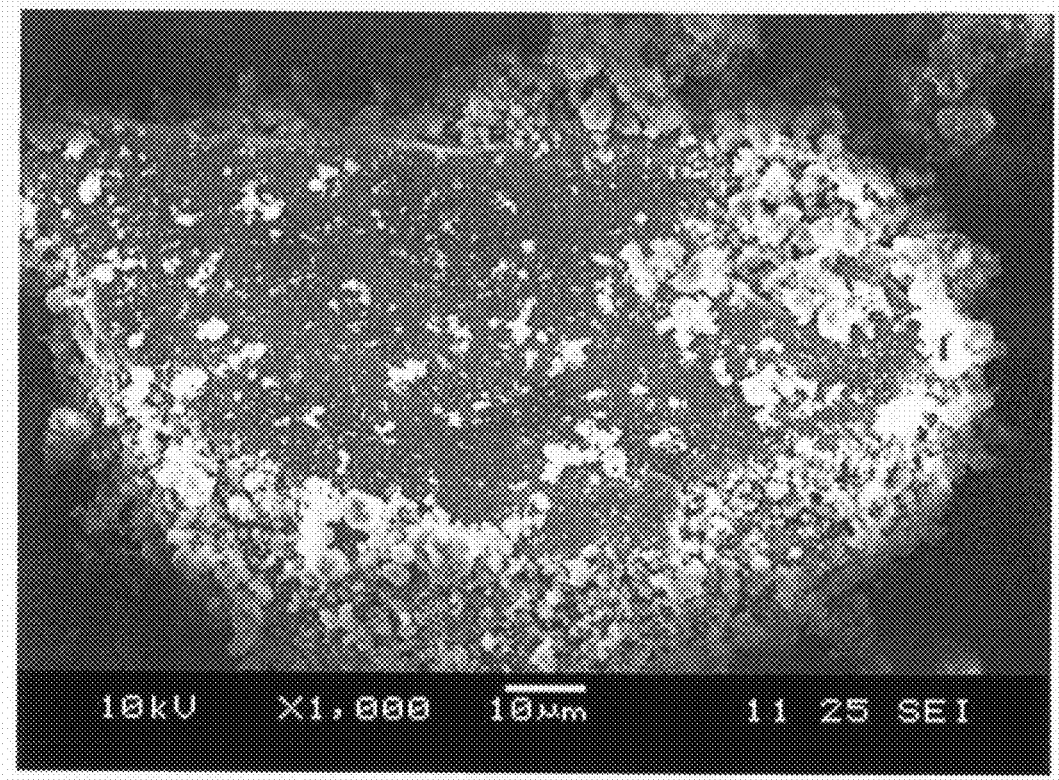

The morphology of the particles of LiH prepared according to the method of this Example appeared much different from that of LiH particles produced commercially (most likely by high temperature hydrogenation reaction). After 20 hours of milling, evidently all of the Li metal has been converted to LiH as suggested by the homogeneity in particle morphology throughout the sample. This result is in contrast to the commercial LiH sample that appears as more or less equiaxed particles in the size range of 5-50 microns (FIG. 2a). The as-synthesized LiH particles are irregular in shape and appear as agglomerations of small particles that may vary from submicron to 5 micron in size (FIG. 2b). Also, the presence of chunks (100-500 microns) of unreacted metallic lithium in a sample milled between 2-4 hours is confirmed by the SEM images shown in FIGS. 2c and 2d.

The hydrogenation reactions were also tested at much lower hydrogen pressures of 25 and 50 bars. While no significant adjustment of the process was required, milling at lower rpm had to be prolonged to 1 hour in order to prevent the pinning of balls. Also, the products obtained after 16 hour were visually darker than the reaction at 350 bar, both of which indicate that the reaction proceeds at a slower rate at lower hydrogen pressures.

To demonstrate the feasibility of production of LiH as a continuous or batch process using the process described in the invention, three batches of LiH product were prepared in three successive runs. After each run, half of the product (0.5 gram in this Example) was withdrawn and fresh batch of Li-metal pieces were added and the milling was continued according to the following scheme wherein no intermittent cleaning of the containers or the balls were necessary:

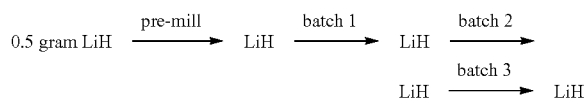

where pre-mill=pre-mill for 15 minutes at 150 rpm in 1 bar Ar.

For batch 1, add about 0.5 gram Li metal, mill for 15 minutes at 150 rpm in Ar
   step 1=30 min. at 150 rpm in 300 bar $H_2$; then
   step 2=16 hr. at 200 rpm in 350 bar $H_2$ For batch 2, remove about 0.5 gram LiH, add 0.5 gram Li metal
   step 1=same as batch 1, then
   step 2=same as batch 1
For batch 3, remove about 0.5 gram LiH, add 0.5 gram Li metal
   step 1=same as batch 1, then
   step 2=same as batch 1

Figure 3:
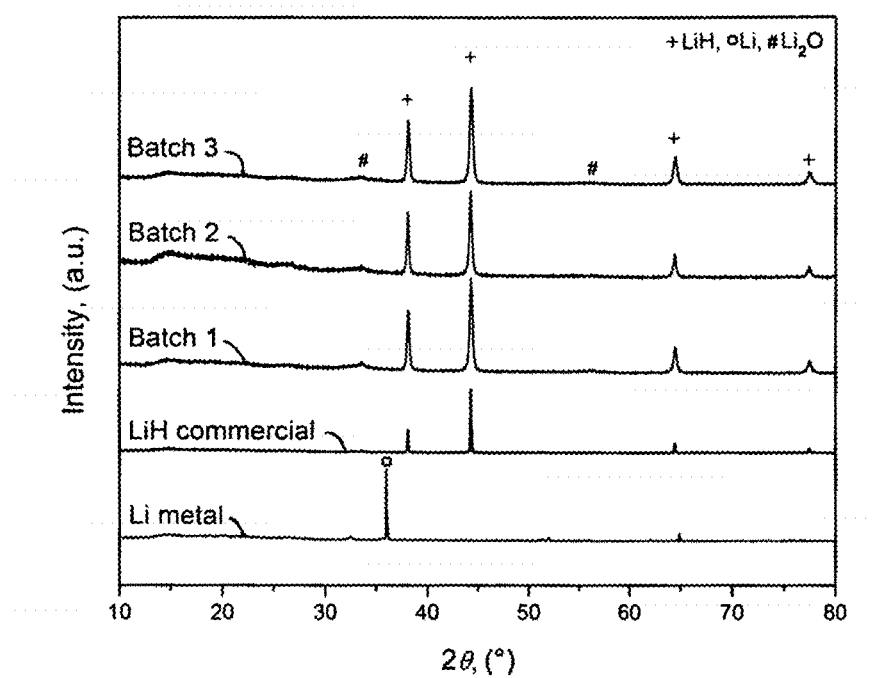
FIG. 3 shows X-ray diffraction patterns for LiH samples prepared in three consecutive runs.

The X-ray diffraction analyses of products from these three batches are shown in the FIG. 3. In particular, as judged by the color of the samples from darker gray to white and also from the X-ray diffraction patterns, complete conversion of Li-metal to LiH was obtained after each step. It may be noted that commercial LiH used in the initial pre-mill step was pre-milled for 15 minutes in argon atmosphere to obtain fine particles and improve its dispersion during milling with lithium and hydrogen. As shown later by the reaction of as-synthesized LiH with $AlCl_3$ and the SEM images, LiH particles produced by milling are more active and much finer than the commercially obtained LiH, and its use as a process control agent in subsequent processing of lithium metal eliminates the need for pre-milling under argon.

Two control experiments were also performed in order to establish the necessity for (1) milling alkali-metal under hydrogen and (2) use of metal hydride powder as a process control agent. In the first experiment, small pieces of Li-metal were charged to high pressure container that was pressurized with hydrogen gas at 350 bars. With no milling operation performed, only a thin layer of dull surface developed over a period of two to three weeks. The dulling of the surface is most likely due to the formation of surface hydride but it was not examined further. In another control experiment, milling of Li metal (without LiH) was attempted under similar milling conditions but within a few minutes balls were pinned to the container as judged by the loss of acoustic noise produced by the collision of balls, and the reaction was stalled.

EXAMPLE 2

Mechanochemical Synthesis of Lithium Hydride (LiH) in a Planetary Ball-Mill

Figure 4:
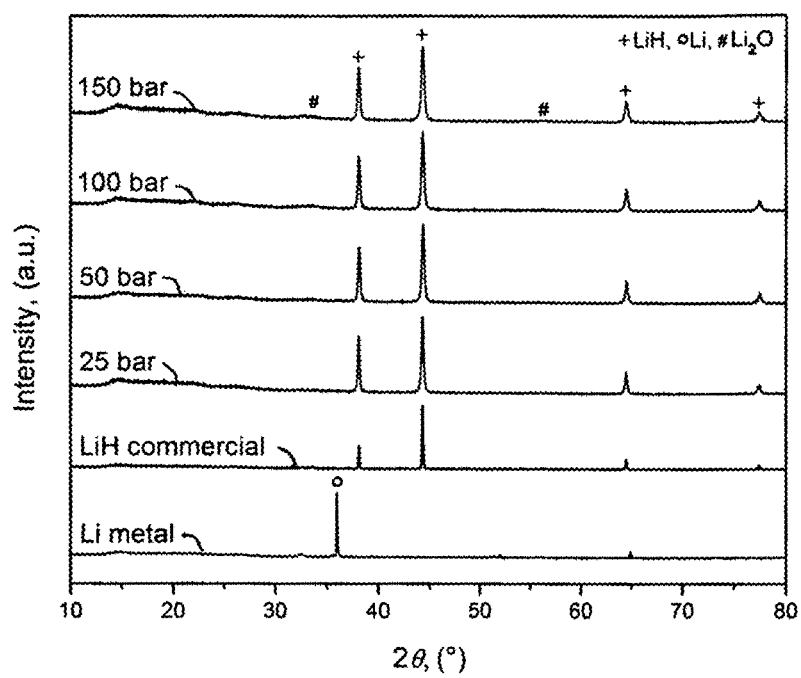
FIG. 4 shows X-ray diffraction patterns of products obtained from milling 1:1 mixture (by wt.) of Li metal and LiH under varying hydrogen pressure.

FIG. 4 shows X-ray diffraction patterns of the products obtained from processing of 0.5 gram of lithium metal with 0.5 gram of LiH (1:1 mixture by weight) in a planetary style ball mill for 60 minutes using the milling container described earlier at hydrogen pressures between 25 and 350 bars. Although as indicated by the absence of Bragg-reflections corresponding to bcc-Li, the transformation appears to be complete, the dark gray appearance of the samples suggest otherwise. It is noted that after 60 minutes of milling the mixture of hydride and finely divided lithium metal starts to accumulate near the bottom of the container and the milling becomes ineffective. The results suggest that the configuration of the planetary mill affords less effective milling as compared to the configuration of the magnetic mill, and hence the method is very well suited for industrial scale mills such as a cannon-ball type mill that rotates horizontally around it revolution axis [Prog. Mater. Sci. 50, 2005].

Considering high ductility of light alkali-metals (Li, Na and K), scale-up operation would optimize the milling parameters such as (1) material charge volume, (2) ball filling ratio, (3) ball size and (4) the rotation speed. Experiments involving higher Li-metal content in the starting mixture such as Li:LiH=4:1, 3:1 or 2:1 were not successful under the applied milling conditions described above since Li-metal forms a thick coat on the balls (commonly seen during milling of soft metals such as Zn, Al etc. because of cold-welding) that are eventually pinned to milling containers and do not produce the required milling action. This suggests that there is an optimal ratio of Li to LiH depending on the milling conditions including the type of the mill used and the mass of each ball.

Hydrogen content in the sample and product yield:

The amount of hydrogen present in the as-prepared LiH was quantitatively determined by utilizing the following reaction:

$$3LiH(s)+AlCl_3(s)=3LiCl(s)+Al(s)+3/2H_2(g)\uparrow$$

Figure 5:
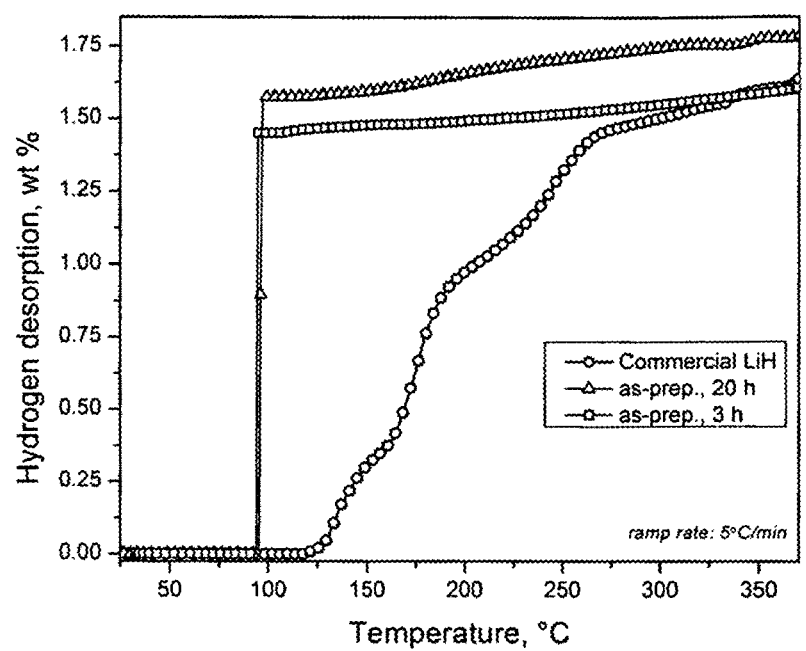
FIG. 5 shows the desorption profile of 3:1 molar mixture of as-prepared LiH and $AlCl_3$.

Approximately 200 mg 3:1 molar mixture of as-prepared LiH and $AlCl_3$ were mixed in an agate mortar and loaded in the autoclave and heated to 370° C. at the rate of 5° C./min. The observed desorption on-set temperature is about 90° C. with a net desorption of 1.7% (for the samples milled between 12-20 hours) of hydrogen by weight which corresponds to about 95% yield of LiH. A less than the theoretical desorption of hydrogen observed for 3 hours milled sample confirms that sample has metallic lithium in a finely divided state that also imparts dark grey color to the samples milled for shorter time. A dramatic change in the desorption profile along with a drop of 25° C. in the onset temperature is also observed, which suggest that the as prepared LiH is significantly more active than LiH obtained commercially. For example, FIG. 5 shows the desorption profile of 3:1 molar mixture of as-prepared LiH and $AlCl_3$.

EXAMPLE 3

Mechanochemical Synthesis of Sodium Hydride (NaH) in Magnetic Ball-Mill

Fine powder of pure sodium hydride was prepared by the reaction of sodium metal and gaseous hydrogen in the magnetic ball mill described in Example 1. In contrast to Example 1 however, a 1:3 molar ratio (also about 1:3 by weight) of Na-metal and sodium hydride had to be employed to achieve effective milling. The 1:3 reaction at 50 bar of hydrogen in the milling container produced fine white powder with no visual trace of unreacted metal (also confirmed by X-ray diffraction of Examples 3, 5, and 6—FIG. 6) after milling the mixture between 6-12 hours. Higher proportions of sodium metal in the starting mixture (e.g 1:1 molar ratio) did not produce the desired results because of pinning of the balls soon after the milling was commenced. It is possible that a larger proportion of metal could be still be used successfully (thereby increasing the net turnover) if the intensity of milling is increased e.g by replacing stainless-steel ball with tungsten carbide balls (a highest density material available for mechanical milling application. Fabrication of tungsten carbide mills for large scale production is a possibility. The presence and pre-mixing of appropriate amounts of metal hydride to facilitate milling as embodied in this invention will allow the use of lower intensity industrial scale mills without significant design alterations.

EXAMPLE 4

Mechanochemical Synthesis of Composite of Lithium Hydride with Sodium Hydride and Potassium Hydride Apart from the preparation of single component metal hydrides, the present invention is also suitable to prepare mixed-metal hydrides i.e. mixture of hydride of two or more alkali metals in various proportions. This aspect of invention is exemplified by the preparation of mixed hydrides of LiH and NaH in 3:1 molar ratio. In order to prepare 2 gram of this mixture, equal weights of LiH and sodium metal were milled together under 50 bars of $H_2$ pressure for a period of 6-12 hours in the magnetic ball mill described in Example 1. A fine white powder is obtained on completion of the reaction, the X-ray diffraction pattern of which shows that all sodium metal is completely transformed to NaH. Likewise, potassium metal and lithium hydride powder were mixed in 1:1 molar ratio and milled under similar conditions as above. A powdered mixture of LiH and KH with 1:1 molar composition was obtained. No trace of unreacted metal was seen, which was also confirmed by X-ray diffraction analysis. This product was further enriched with KH by adding another mole of potassium metal to the obtained mixture and continued milling under similar conditions. Thus, based on a particular application the amounts of individual hydrides (MH(M=Li—Cs) could be easily controlled by this method.

EXAMPLE 5

Mechanochemical Synthesis of Pure Potassium Hydride (KH) and Rubidium Hydride (RbH)

Figure 6:
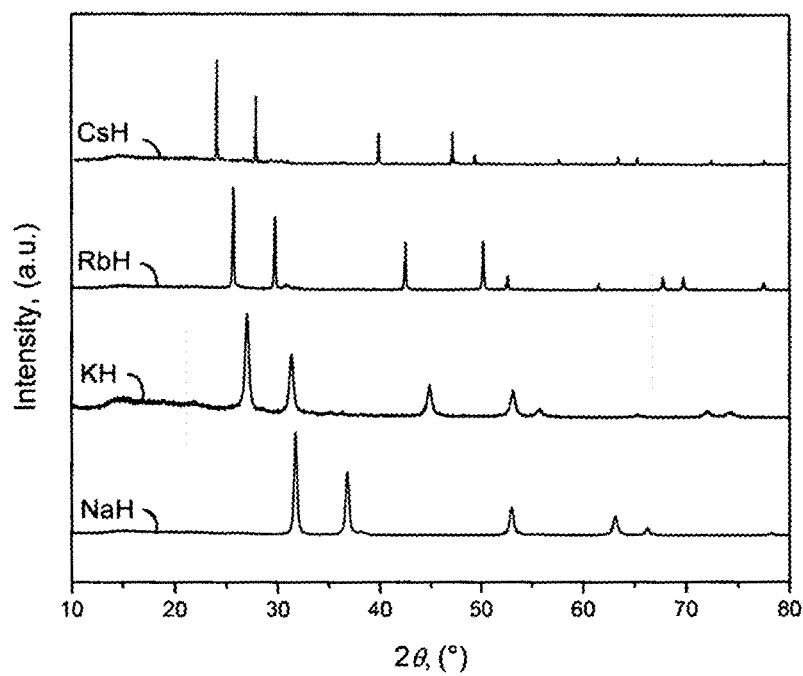
FIG. 6 shows X-ray diffraction patterns of as-synthesized NaH, KH, RbH and CsH as described in examples 3, 5 and 6.

Fine powder of potassium hydride was prepared by using the method of this invention as described above in Examples 1, 3 and 4 using the magnetic ball mill. However, to obtain potassium hydride powder for initial mixing as embodied in the method of this invention, 2 grams of potassium metal was packed in a custom-built milling container (described in Example 1) along with the container being pressurized to 50 bars of hydrogen gas, and heated slightly above the melting temperature of potassium (about 64° C.) and milling was commenced while the container was warm. The liquid state of the metal during the initial few minutes of milling facilitates formation of potassium hydride in quantities sufficient to form a coat both on the walls and on the balls, therefore, preventing cold welding and promoting the hydrogenation reaction to completion. Although fine powder of potassium hydride was obtained after completion of this procedure, technical problems associated with heating the vessel at elevated temperatures under hydrogen pressure at large scale could be clearly envisaged. Thereafter, small pieces of potassium metal (1 gram) were added to the KH powder so obtained and the mixture was milled at 50 bars for 6-12 hours at room temperature. Visual examination of the product and the X-ray diffraction revealed that all metal is fully converted to the hydride (FIG. 6).

In a similar process 2 grams of rubidium metal was heated in the milling container (described in Example 1) above its melting temperature of about 40° C. with the container pressurized to a hydrogen pressure of 50 bars, followed by milling for 6 hours. Another 2 grams of metal was then added to the white powder of RbH so obtained and milled for 6-12 hours under 50 bar $H_2$ at room temperature. Once again, X-ray diffraction (FIG. 6) and visual examination of the obtained powder suggest quantitative conversion of metal to its hydride.

EXAMPLE 6

Mechanochemical Synthesis of Cesium Hydride (CsH)

Cesium hydride (CsH) was prepared by milling cesium metal under hydrogen pressure of 25 bars for up to 24 hours using the magnetic ball mill described in Example 1. Five (5) grams of metal was placed in the milling container along with the stainless steel balls. The milling container was pressurized to a hydrogen pressure of 25 bars. Contrary to other alkali metal/hydrides described above, it was not necessary to add pre-formed CsH in order for milling to proceed. This is because Cs has very low melting point and the metal is perhaps in a liquid state soon after the milling is started. The liquid metal does not result in cold welding, and the reaction easily proceeds to completion. X-ray diffraction analysis shows quantitative conversion of Cs metal to CsH (FIG. 6).

While the invention has been described in terms of specific embodiments, it is not intended to be limited thereto but rather only to the extent recited in the following claims.

We claim:

1. A method of making alkali metal hydride, comprising mechanochemically reacting an alkali metal and hydrogen gas in the presence of preformed alkali metal hydride powder at a temperature of about 0 to about 100 degrees C. to form the alkali metal hydride.

2. The method of claim 1 wherein the hydrogen gas is provided initially or over time in a stoichiometric amount to convert substantially all of the alkali metal to alkali metal hydride.

3. The method of claim 1 where the hydrogen gas comprises essentially pure lightest isotope protium—$^1$H.

4. The method of claim 1 where the hydrogen gas comprises essentially pure heavy isotope deuterium—$^2$H.

5. The method of claim 1 where the hydrogen gas comprises essentially pure heaviest isotope tritium—$^3$H.

6. The method of claim 1 where the hydrogen gas comprises a mixture of $^1$H, $^2$H and $^3$H, in which any of the isotopes is present in concentrations ranging between 1 and 99 vol. %.

7. The method of claim 2 including providing a hydrogen gas pressure of about 1 to 350 bars.

8. The method of claim 7 wherein the hydrogen gas pressure is from 25 to 350 bars.

9. The method of claim 1 wherein the temperature is from 10 to 40 degrees C.

10. The method of claim 9 wherein the temperature is about 20 to about 26 degrees C.

11. The method of claim 1 wherein a reaction time is 20 hours or less.

12. The method of claim 1 wherein the alkali metal comprises at least one of Li, Na, K, Rb, and Cs.

13. The method of claim 12 wherein the metal comprises at least two of Li, Na, K, Rb, and Cs to form a mixed metal hydride.

14. The method of claim 1 including providing a mixture of the alkali metal and the pre-formed alkali metal hydride and the hydrogen gas in a reactor.

15. The method of claim 1 wherein the alkali metal hydride includes an alkali metal deuteride or alkali metal tritide.

16. The method of claim 1 wherein the alkali metal and hydrogen gas are reacted in the presence of the preformed alkali metal hydride powder in a ball mill.

17. The method of claim 16 wherein the ball mill is a magnetic ball mill.

18. The method of claim 16 wherein the ball mill is a planetary mill.

19. The method of claim 16 wherein the ball mill is a commercial scale mill.

20. A method of making lithium hydride, comprising mechanochemically reacting lithium metal and hydrogen gas in the presence of preformed lithium hydride powder at a temperature of about 0 to about 100 degrees C. to form the lithium hydride.

* * * * *